US012624796B2

(12) United States Patent
Rouzeau et al.

(10) Patent No.: US 12,624,796 B2
(45) Date of Patent: May 12, 2026

(54) LIQUEFIED GAS STORAGE FACILITY COMPRISING A POLYGONAL LOAD-BEARING STRUCTURE

(71) Applicant: GAZTRANSPORT ET TECHNIGAZ, Saint-Remy-les-Chevreuse (FR)

(72) Inventors: Jean-Guy Rouzeau, Saint-Remy-les-Chevreuse (FR); Leo Coquand, Saint-Remy-les-Chevreuse (FR)

(73) Assignee: GAZTRANSPORT ET TECHNIGAZ, Saint-Remy-les-Chevreuse (FR)

( * ) Notice: Subject to any disclaimer, the term of this patent is extended or adjusted under 35 U.S.C. 154(b) by 14 days.

(21) Appl. No.: 18/923,424

(22) Filed: Oct. 22, 2024

(65) Prior Publication Data

US 2025/0137588 A1 May 1, 2025

(30) Foreign Application Priority Data

Oct. 27, 2023 (FR) .................................. FR2311719

(51) Int. Cl.
*F17C 3/00* (2006.01)
*F17C 9/00* (2006.01)

(52) U.S. Cl.
CPC .................. *F17C 3/00* (2013.01); *F17C 9/00* (2013.01); *F17C 2201/0157* (2013.01);
(Continued)

(58) Field of Classification Search
CPC ...... F17C 3/00; F17C 9/00; F17C 2270/0134; F17C 2270/01; F17C 2270/0102;
(Continued)

(56) References Cited

U.S. PATENT DOCUMENTS 3,339,783 A * 9/1967 Gorman .................... F17C 3/06 220/560.11
4,062,468 A * 12/1977 Bongiovanni ......... B65D 90/06 220/567.2

(Continued)

FOREIGN PATENT DOCUMENTS

FR 2912385 A1 8/2008
FR 2951521 A1 4/2011

(Continued)

OTHER PUBLICATIONS

Search Report by French Patent and Trademark Office dated Apr. 22, 2024—see pp. 3 and 7.

*Primary Examiner* — Robert J Hicks
(74) *Attorney, Agent, or Firm* — Notaro, Michalos & Zaccaria P.C.

(57) ABSTRACT

A liquefied gas storage facility (1) has a load-bearing structure (10) having a bottom wall (11) and a vertical load-bearing wall (12) made up of N vertical load-bearing panels (14), and a tank comprising a bottom wall (21) and a vertical wall (22). The bottom wall (21) has a plurality of angular sectors. The corrugated sealing membrane (70, 170) of each angular sector (25) has first corrugations (72). The corrugated sealing membrane (70, 170) of each angular sector (25) has a plurality of metal plates (71) arranged to form ring portions (75). The ring portions (75) consist of a set of complete metal plates. The total number of first corrugations (72) present on the ring portions (75) increases in the direction of the vertical wall (22). The total number being increased only every M successive ring portions (75), where M is a natural integer greater than or equal to 2.

15 Claims, 5 Drawing Sheets

(52) U.S. Cl.
CPC *F17C 2205/0355* (2013.01); *F17C 2221/033* (2013.01); *F17C 2223/0153* (2013.01); *F17C 2227/0135* (2013.01); *F17C 2270/0134* (2013.01)

(58) Field of Classification Search
CPC .......... F17C 2203/00; F17C 2227/0135; F17C 2201/0157; F17C 2201/0147; F17C 2205/0355; F17C 2221/033; F17C 2223/0153; B60K 15/03006; B60K 15/03; B65D 7/12
USPC .......... 220/560.11, 560.06, 567.2, 565, 4.12, 220/682, 680, 678, 677, 560.08; 62/573.1; 52/573.1
See application file for complete search history.

(56) References Cited

U.S. PATENT DOCUMENTS

| | | | |
|---|---|---|---|
| 6,035,795 | A | 3/2000 | Dhellemmes et al. |
| 2010/0071285 | A1 | 3/2010 | Richard et al. |
| 2012/0168445 | A1 | 7/2012 | Ezzarhouni |
| 2024/0084968 | A1 | 3/2024 | Volut et al. |

FOREIGN PATENT DOCUMENTS

| | | | |
|---|---|---|---|
| FR | 3121196 | A | 9/2022 |
| WO | WO2022200536 | A1 | 9/2022 |

* cited by examiner

[Fig. 1]
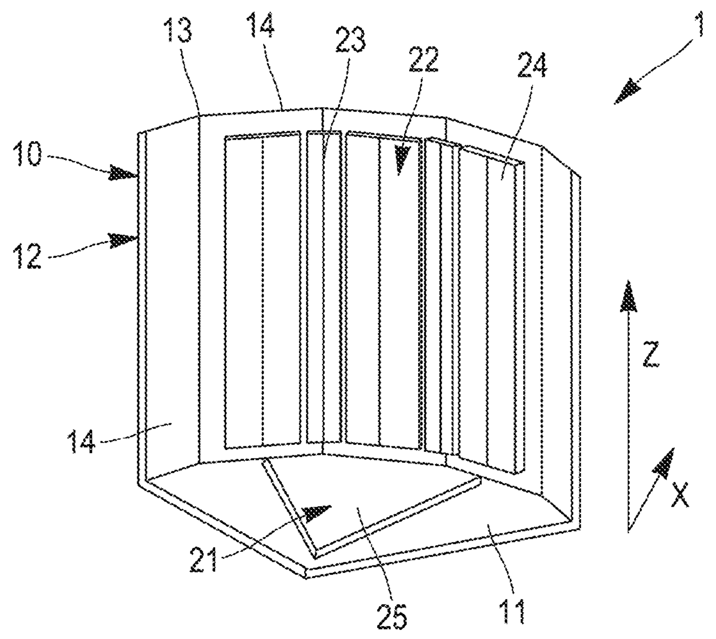
[Fig. 2]
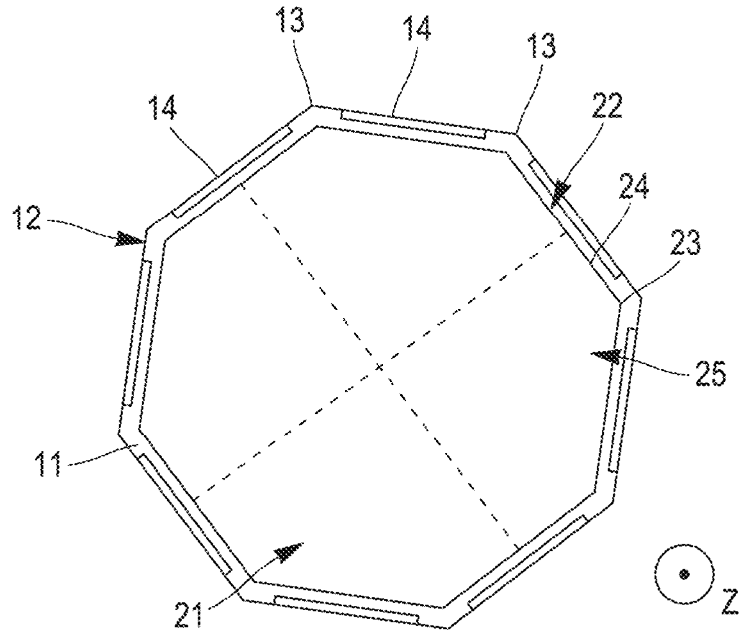

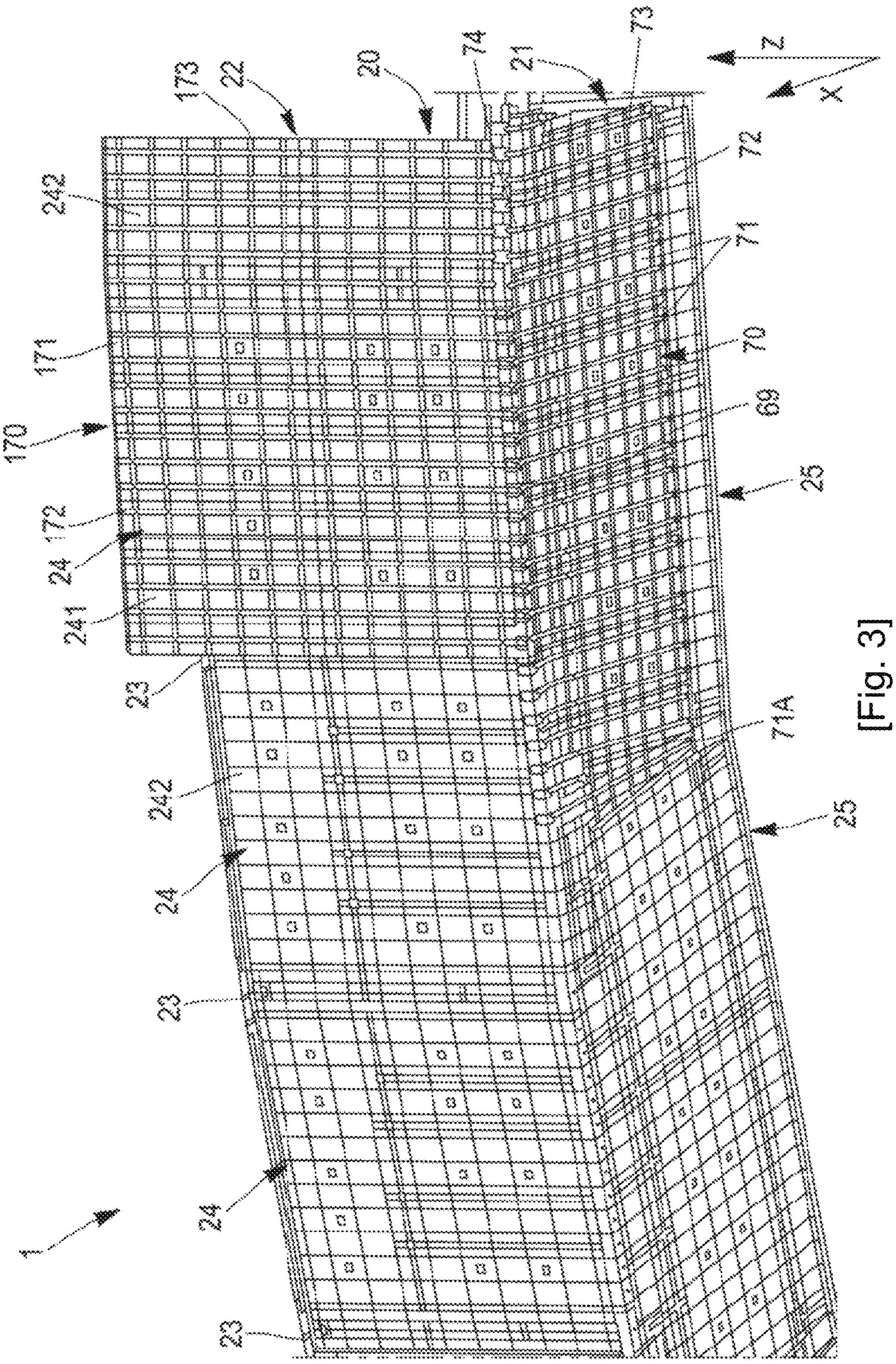
[Fig. 3]
PRIOR ART

[Fig. 4]
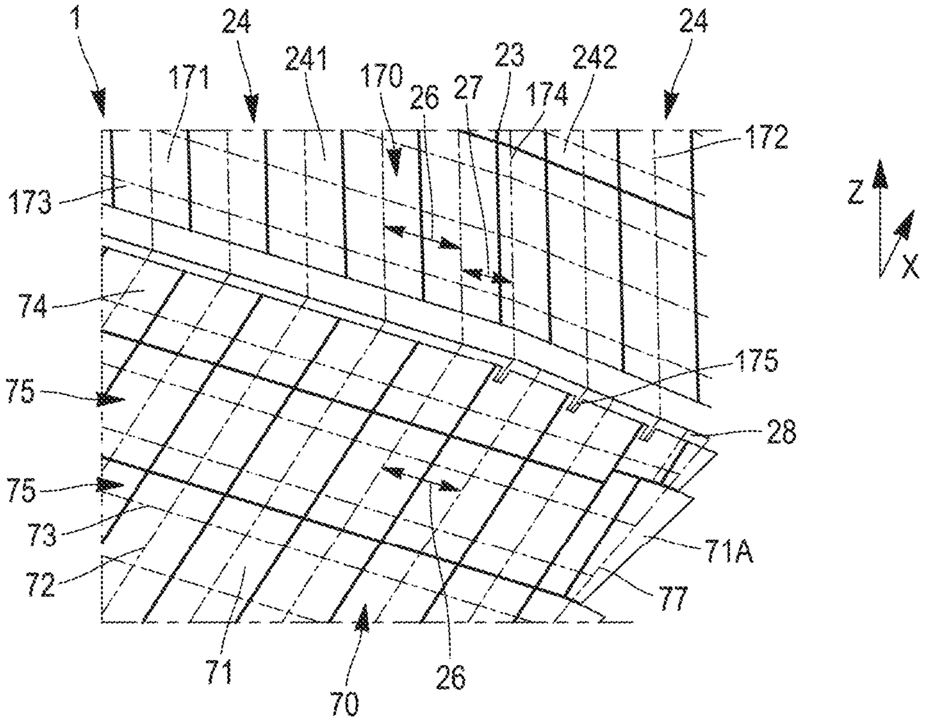
[Fig. 5]
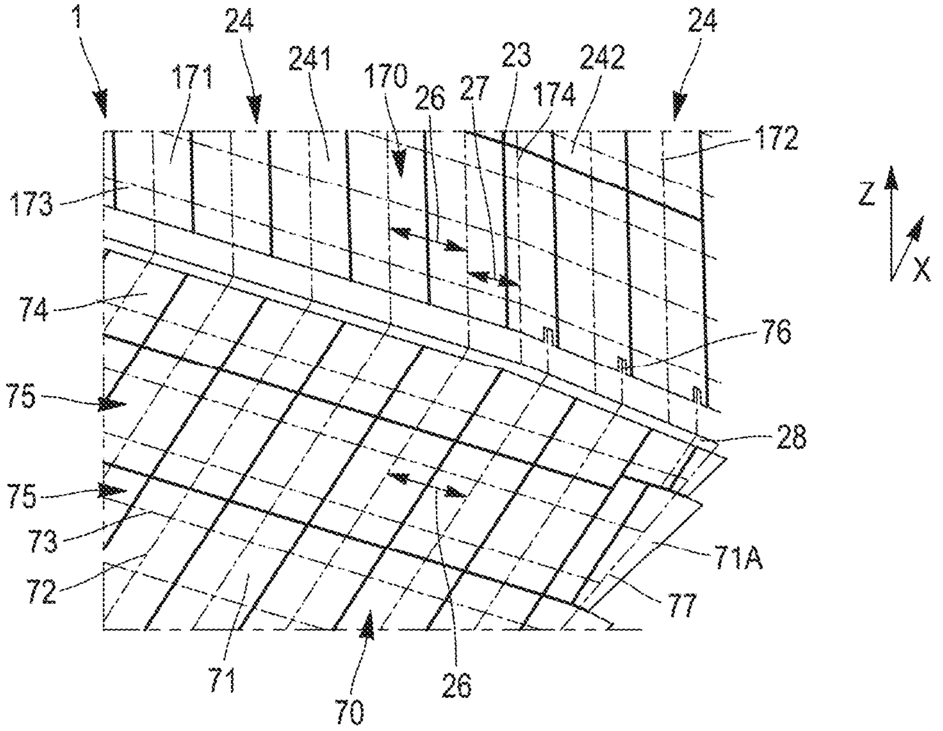

[Fig. 6]
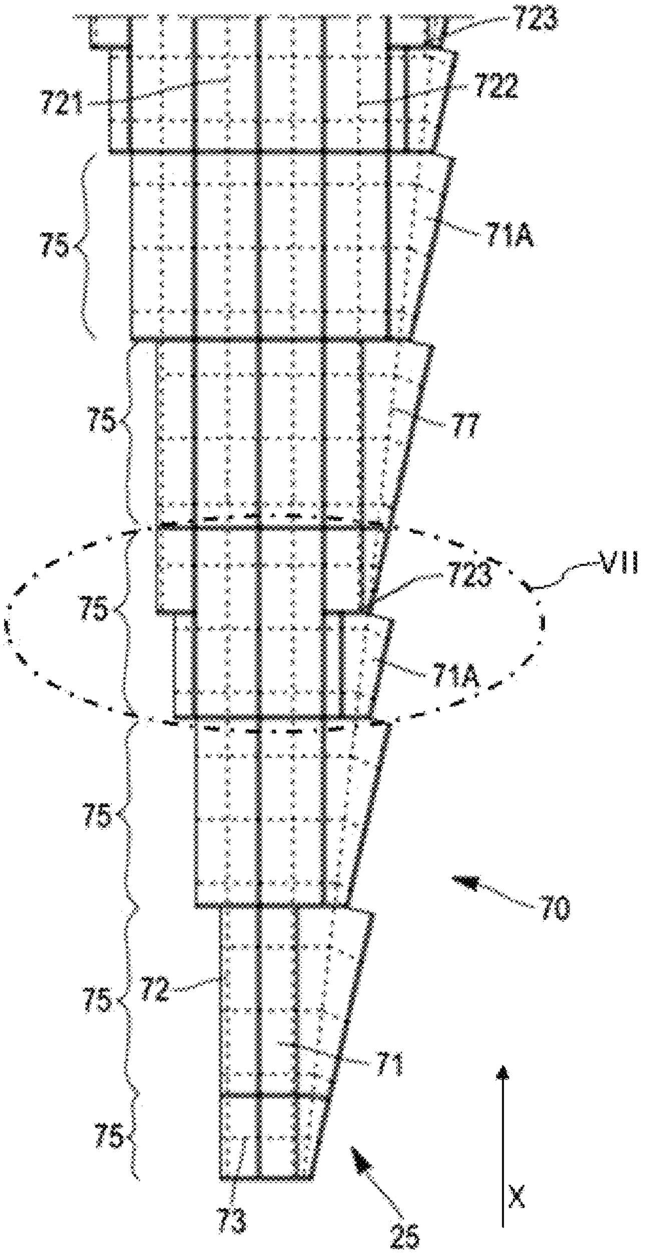

[Fig. 7]
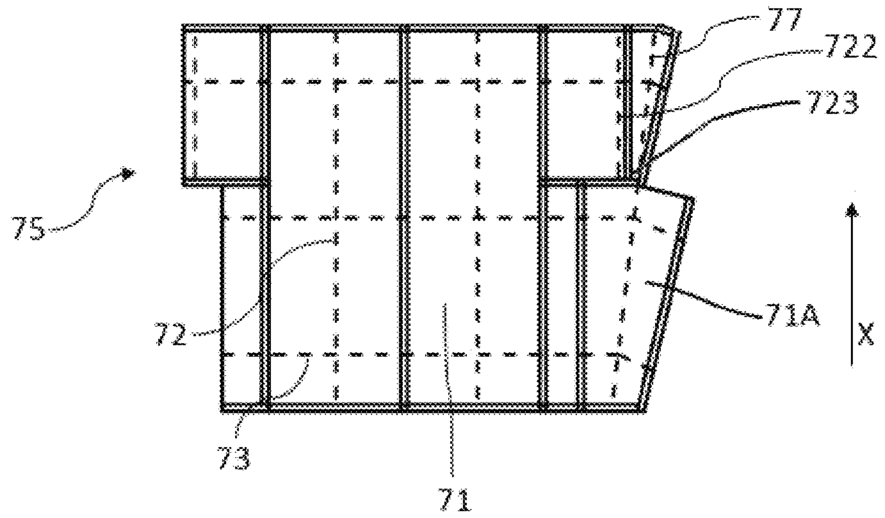
[Fig. 8]
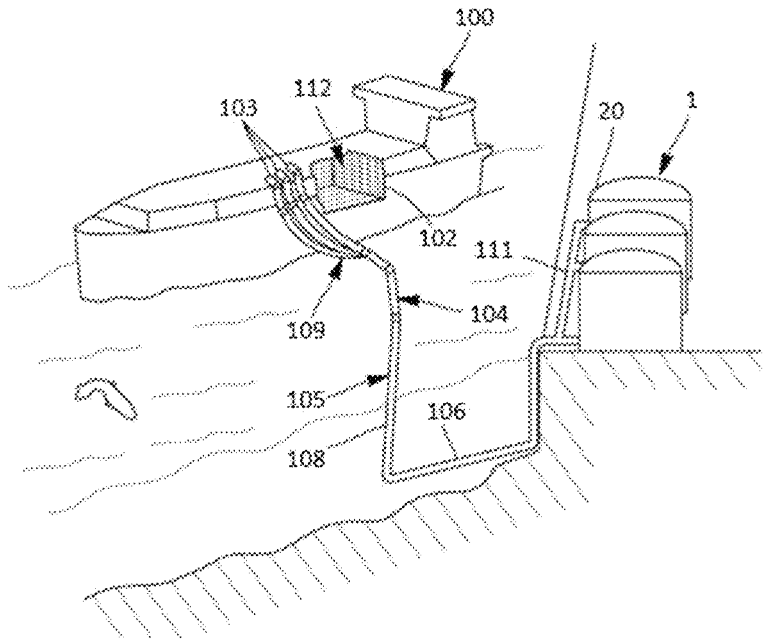

LIQUEFIED GAS STORAGE FACILITY COMPRISING A POLYGONAL LOAD-BEARING STRUCTURE

TECHNICAL FIELD

The invention relates to a liquefied gas storage facility and to a marking-out method for constructing this facility. More particularly, the liquefied gas storage facility comprises a load-bearing structure having a bottom wall in the shape of a regular polygon.

TECHNOLOGICAL BACKGROUND

A liquefied gas storage facility comprising a load-bearing structure having an internal space delimited by a bottom load-bearing wall and a sealed and thermally insulating tank installed in the internal space of the load-bearing structure is known from document FR-A-2912385 or FR-A-3121196. The tank comprises a bottom wall placed on the bottom load-bearing wall and a vertical wall placed on the vertical load-bearing wall.

The vertical wall has a plurality of vertical panels. The bottom wall has a plurality of sectors that are the image of one another through rotation, and where said bottom wall has the shape of a regular polygon each side of which corresponds to one of said vertical panels. The number of vertical panels is for example chosen to be equal to 56.

The sealed and thermally insulating tank comprises a corrugated sealing membrane intended to be in contact with a liquefied gas and a thermally insulated barrier situated between the sealing membrane and the load-bearing structure.

The sealing membrane of the vertical wall comprises vertical corrugations. As for the sealing membrane of the bottom wall, this comprises first corrugations spaced apart from one another by a corrugation pitch and oriented along a sector axis perpendicular to the vertical panel connected to said angular sector. The corrugated sealing membrane of each angular sector of the bottom wall comprises a plurality of rectangular metal plates welded together in a fluid tight manner such that they are arranged to form ring portions juxtaposed successively along the sector axis. The term ring portion applies to a set of complete metal plates. In other words, the edges of the ring portions consist of the edges of the metal plates. The ring portions situated in the various angular sectors are joined together to form rings around a central portion of the bottom wall.

The prior art applies a layout strategy arranged by angular sector which seeks to establish a link between the corrugation pitch of the first corrugations and the length of the metal plates, which defines a width of the ring portion, and the angle of the angular sector so as notably to reduce the number of different parts in an angular sector.

Nevertheless, by varying the corrugation pitch, and notably when this pitch increases, this layout strategy is no longer able to maintain consistent angular-sector angles and/or consistent metal-plate lengths and thus reduces the number of possible solutions.

SUMMARY OF THE INVENTION

One idea behind the invention is that of improving the layout strategy whereby the bottom wall is arranged in angular sectors in such a way as to keep the angular-sector angles consistent and the sheet lengths consistent, without making the layout more complex.

One object of the invention is notably to create a membrane layout that allows the corrugation pitch to be greater than the increment in length of the outer edge of the ring portion between two successive rings. This length increment is close to the width of the ring portion multiplied by the sector angle.

According to one embodiment, the invention provides a liquefied gas storage facility comprising:

a load-bearing structure having an internal space delimited by a bottom load-bearing wall and a vertical load-bearing wall, a contour of said bottom load-bearing wall having the shape of an N-sided regular polygon, N being an integer greater than or equal to 4, said vertical load-bearing wall being made up of N vertical load-bearing panels and forming a polygonal cylindrical surface having said regular polygon as its directrix, where each of the N sides of the polygon corresponds to an intersection between the bottom load-bearing wall and one of said vertical load-bearing panels;

and a sealed tank installed in the internal space of the load-bearing structure, the sealed tank comprising a bottom wall placed on the bottom load-bearing wall and a vertical wall placed on the vertical load-bearing wall, said vertical wall being made up of N vertical panels, each vertical panel of the vertical wall being fixed to one of the N vertical load-bearing panels, said bottom wall comprising a plurality of angular sectors that are the image of one another through rotation by a predetermined angle about a vertical axis, the predetermined angle being equal to $k \cdot 360°/N$, where k is a positive integer less than or equal to half of N, each angular sector of the bottom wall being connected to at least k of the N vertical panels of the vertical wall, the sealed tank comprising a corrugated sealing membrane intended to be in contact with a liquefied gas, wherein the corrugated sealing membrane of each angular sector of the bottom wall has first corrugations oriented along a sector axis, the sector axis being perpendicular to a first vertical panel selected from among the N vertical panels of the vertical wall, the first corrugations being spaced one from the next by a regular corrugation pitch, wherein the corrugated sealing membrane of each angular sector of the bottom wall comprises a plurality of metal plates welded together in a fluidtight manner, the metal plates being arranged to form ring portions juxtaposed successively along the sector axis, each ring portion consisting of a set of complete metal plates and having an inner edge and an outer edge which are perpendicular to the sector axis, wherein the total number of first corrugations per ring portion that are present on the ring portions increases in the direction of the first vertical panel, said total number per ring portion being increased only every M successive ring portions where M is a natural integer greater than or equal to 2.

In other words, the total number per ring portion is therefore constant in each group of M successive ring portions.

By virtue of these features, by increasing the total number of corrugations every M ring portions it is possible to modulate by the factor M the layout strategy that links the regular corrugation pitch for the first corrugations and the width of the ring portions. Thus, depending on the higher or lower value of the regular corrugation pitch, the factor M makes it possible to obtain layout solutions that have consistent values for the angular-sector angle and for the size of the sheets that make up each ring portion in particular.

Specifically, in the prior art, the width of a ring portion, L, the regular corrugation pitch P and the angular-sector angle A are linked by the following equation:

$$\tan(A/2) = P/L$$

The factor M is thus inserted into this equation as follows:

$$\tan(A/2) = P/(M * L)$$

In this way, when, for example, the regular corrugation pitch P is increased significantly by comparison with the corrugation pitch of the prior art, the factor M makes it possible to keep the angular-sector angle values and metal-sheet size values within an acceptable range.

According to the embodiments, such a storage facility may have one or more of the following features.

According to one embodiment, the sealing membrane comprises a first ring portion, a second ring portion and a third ring portion these being arranged successively along the sector axis and in the direction of the first vertical panel, the total number of first corrugations in the first ring portion being equal to N1, the total number of first corrugations of the second ring portion being equal to N1, and the total number of first corrugations of the third ring portion being equal to N2, where N1 and N2 are natural positive integers, for example with N2 equal to N1+2. This case corresponds to a factor M equal to 2.

According to one embodiment, the sealing membrane comprises a first ring portion, a second ring portion, a third ring portion and a fourth ring portion these being arranged successively along the sector axis and in the direction of the first vertical panel, the total number of first corrugations in the first ring portion being equal to N1, the total number of first corrugations of the second ring portion being equal to N1, the total number of first corrugations of the third ring portion being equal to N1 and the total number of first corrugations of the fourth ring portion being equal to N2, where N1 and N2 are natural positive integers, for example with N2 equal to N1+2. This case corresponds to a factor M equal to 3.

According to one embodiment, one or each ring portion comprises a plurality of rectangular metal plates.

According to one embodiment, the ring portions each have a width extending along the sector axis between the inner edge and the outer edge of the ring portion, said width being equal in several of said ring portions, notably in successive ring portions along the sector axis.

According to one embodiment, the width of the ring portion situated close to a centre of the bottom wall and/or the width of the ring portion situated close to the vertical wall is different from the width of the other ring portions, the other ring portions preferably having identical widths to one another.

According to one embodiment, the width of at least one of the ring portions is different from the equal width of said several ring portions, for example equal to a whole fraction of the equal width of said several ring portions.

According to one embodiment, the regular corrugation pitch is greater than the width of one of the ring portions multiplied by the predetermined angle.

According to one embodiment, N is an even number and is preferably greater than or equal to 4.

According to one particular embodiment, N is comprised between 8 and 56.

According to another particular embodiment, N is equal to 56. According to another particular embodiment, N is equal to 8.

The integer k is equal to the number of vertical panels of the vertical wall, divided by the number of angular sectors of the bottom wall of the tank. According to one embodiment, k is equal to 1 or to 2.

According to one embodiment, the regular corrugation pitch is greater than or equal to 400 mm, preferably greater than or equal to 800 mm, preferentially comprised between 800 and 1200 mm, and for example equal to 1000 mm.

For example, when N is equal to 56 and the width of one of the ring portions is equal to 3000 mm, the regular corrugation pitch may be equal to 1020 mm and the natural integer M may be equal to 3.

According to one embodiment, one or each ring portion of an angular sector comprises at least one corrugated metal connecting plate situated on one lateral edge of the ring portion, the corrugated metal connecting plates being configured to connect said ring portion to a ring portion of an adjacent angular section, the corrugated metal connecting plates that connect the ring portions being aligned with one another in a radial direction, the radial direction being inclined with respect to the sector axis preferably by an angle equal to half the predetermined angle.

According to one embodiment, the sealing membrane of the or each angular sector of the bottom wall comprises a radial corrugation situated near one edge of the angular sector, the radial corrugation extending in the radial direction.

According to one embodiment, the first corrugations of the angular sector or of each angular sector comprise first complete corrugations extending from a junction between the bottom wall and the vertical wall as far as a central ring portion near a centre of the bottom wall, and first partial corrugations which are interrupted by a corrugation interruption where said first partial corrugation crosses one of the corrugated metal connecting plates, the corrugation interruption being situated some distance from the radial corrugation.

According to one embodiment, the radial corrugation of the angular sector is created on the corrugated metal connecting plates.

According to one embodiment, the corrugated metal connecting plate for a ring portion of row A is identical to the corrugated metal connecting plate of a ring portion of row A+B, where for example a row A is equal to 1 for a central ring portion situated near a centre of the bottom wall, where the row is defined as being a natural integer incremented by 1 progressing along the sector axis towards the vertical wall, A being a natural integer greater than or equal to 1 and B being a natural integer greater than or equal to 2.

According to one embodiment, the natural integer B is equal to the natural integer M.

According to one embodiment, the sealing membrane of an angular sector or of each angular sector of the bottom wall comprises second corrugations spaced apart from one another and extending at least partially perpendicular to the first corrugations.

According to one embodiment, the corrugation interruption of the first partial corrugations is situated between two adjacent second corrugations.

According to one embodiment, a ship for transporting a cold liquid product has a double hull and an aforesaid storage facility arranged in the double hull.

According to one embodiment, the invention also provides a system for transferring a cold liquid product, the system comprising the aforesaid ship, insulated pipes arranged such that they connect the tank installed in the hull of the ship to a floating or onshore storage facility, and a pump for driving a stream of cold liquid product through the insulated pipes from or to the floating or onshore storage facility to or from the tank of the ship.

According to one embodiment, the invention also provides a method for loading or offloading from such a ship, wherein a cold liquid product is conveyed through insulated pipes from or to a floating or onshore storage structure to or from the tank of the aforesaid ship.

BRIEF DESCRIPTION OF THE FIGURES

The invention will be better understood, and further aims, details, features and advantages thereof will become more clearly apparent in the course of the following description of several particular embodiments of the invention, which are given solely by way of non-limiting illustration, with reference to the appended drawings.

FIG. 1 depicts a partial, perspective, and sectioned view of a liquefied gas storage facility.

FIG. 2 is a view from above of the storage facility of FIG. 1, enabling the polygonal contour of the load-bearing structure of FIG. 1 in one exemplary embodiment to be discerned.

FIG. 3 is a partial and perspective view, from the inside of a liquefied storage facility according to the prior art, of the outer end of an angular sector of the bottom wall and of portions of the vertical wall of the tank.

FIG. 4 is a schematic and perspective view, from the inside of the liquefied gas storage facility, of a portion of an angular sector of the bottom wall and of portions of the vertical wall of the tank, according to a first embodiment.

FIG. 5 is a schematic and perspective view, from the inside of the liquefied gas storage facility, of a portion of an angular sector of the bottom wall and of portions of the vertical wall of the tank, according to a second embodiment.

FIG. 6 depicts a view from above of the sealing membrane of a sector of the bottom wall of a tank installed in a liquefied gas storage facility, viewed from the inside of the liquefied gas storage facility according to one embodiment.

FIG. 7 is a view of detail VII of FIG. 6, more specifically depicting a ring portion.

FIG. 8 is a cut-away schematic depiction of a methane carrier ship comprising a ship's tank and of a terminal for loading/offloading from this tank.

DESCRIPTION OF THE EMBODIMENTS

As mentioned above, the invention is concerned with producing a liquefied gas storage facility, which bears the reference 1 in the description that follows. The facility 1 is capable of storing a liquefied gas, in particular liquefied natural gas (LNG) at a temperature of around −162° C. and at atmospheric pressure, or other liquefied gases.

The facility 1 chiefly comprises a load-bearing structure 10 and a sealed and thermally insulating tank 20 installed in the internal space of the load-bearing structure 10.

The load-bearing structure 10 will be described first of all. The load-bearing structure 10 comprises a bottom load-bearing wall 11 and a vertical load-bearing wall 12.

The facility 1 may be intended to be situated on shore. The bottom load-bearing wall 11 is then typically horizontal, which is to say situated in a plane perpendicular to the direction of acceleration due to gravity, indicated in the figures by a vertical axis Z, to within dimensional tolerances. The bottom load-bearing wall 11 may be situated at ground level or possibly below ground level. The load-bearing structure 10 is for example made of concrete.

Hereinafter, consideration will more particularly be given to the case of a facility 1 which is situated on shore and in which the bottom load-bearing wall 11 is horizontal. It is nevertheless specified that the description that follows applies to any orientation of the bottom load-bearing wall 11 with respect to the direction of acceleration due to gravity.

The contour of the bottom load-bearing wall 11 is intended to have the shape of an N-sided regular polygon, N being an integer greater than or equal to 4. A facility 1 in which N is equal to 8 or to 56 is more particularly beneficial.

Aside from the bottom load-bearing wall 11, the load-bearing structure 10 comprises a vertical load-bearing wall 12. As is best visible in FIG. 1, this vertical load-bearing wall 12 forms a polygonal cylindrical surface having the polygon formed by the polygonal contour of the bottom load-bearing wall 11 as its directrix. The vertical load-bearing wall 12 extends in a vertical direction, namely in a direction perpendicular to the plane of the bottom load-bearing wall 11, to within the dimensional tolerances.

With reference to FIGS. 1 and 2, the vertical load-bearing wall 12 is made up of N vertical load-bearing panels 14. For each of the N sides of the polygonal contour of the bottom load-bearing wall 11 there is a corresponding intersection between the bottom load-bearing wall 11 and one of the vertical load-bearing panels 14. The vertical load-bearing panels 14 are connected to one another by corner edges 13, each corner edge 13 corresponding to a vertex of the polygonal contour of the bottom load-bearing wall 11.

One embodiment of a sealed and thermally insulating tank 20 that can be installed in the internal space of the load-bearing structure 10 is now described with reference to FIGS. 1 to 8. The tank 20 comprises a bottom wall 21 placed on the bottom load-bearing wall 11 and a vertical wall 22 placed on the vertical load-bearing wall 12. In the same way as the bottom load-bearing wall 11, the bottom wall 21 has a contour in the shape of an N-sided regular polygon.

The vertical wall 22 is made up of N vertical panels 24. For each of the N sides of the polygonal contour of the bottom wall 21 there is a corresponding intersection between the bottom wall 21 and one of the vertical panels 24. The vertical panels 24 are connected to one another by corner edges 23, each corner edge 23 corresponding to a vertex of the polygonal contour of the bottom wall 21.

The bottom wall 21 comprises a plurality of angular sectors 25. The sectors 25 are the image of one another through rotation about a vertical axis, namely about an axis extending parallel to the vertical panels 24. This vertical axis passes through a point situated in the vicinity of the geometric centre of the bottom load-bearing wall 11. More specifically, the sectors 25 are the image of one another through rotation by an angle equal to 4×180°/N, in instances in which an angular sector 25 is connected to two vertical panels 24. By virtue of this exactly repeating structure, the same parts can be used for constructing each angular sector 25.

In the example depicted in FIGS. 3 and 6, N=56, and in the one depicted in FIG. 2, N=8. In order not to overload the drawing, just one sector 25 is depicted in FIG. 6.

The bottom wall 21 and the vertical wall 22 comprise, working from the load-bearing structure 10 towards the interior space of the tank 20, a secondary thermally insulating barrier, a secondary sealing membrane, a primary thermally insulating barrier, and a primary sealing membrane 70 which is intended to be in contact with the liquefied gas contained in the tank 20. The bottom wall 21 and the vertical wall 22 may be produced using modular elements. These modular elements may correspond to the GST® technology marketed by the applicant. Thus, reference may be made to document U.S. Pat. No. 6,035,795 for a description of certain modular elements, and to document WO2022/200536 for other specifics of this technology which is not described here.

The primary sealing membrane 70 of the bottom wall 21 is chiefly made up of juxtaposed rectangular metal plates 71. On one of the lateral edges of the sectors 25, the primary sealing membrane 70 further comprises metal connecting plates 71A. The metal connecting plates 71A are of trapezoidal overall shape and allow said sector 25 to be connected to an adjacent sector 25, thus enabling the primary sealing membrane 70 to be completed.

The primary sealing membrane 70 is corrugated, so as to allow it to withstand the phenomena of thermal contraction caused by contact with the liquefied gas. More specifically, at the bottom wall 21, the primary sealing membrane 70 has at least radiating corrugations 72, which is to say corrugations that are parallel to one another and extend along a sector axis X from the centre of the tank 20 towards the vertical panels 24, the sector axis X being perpendicular to the vertical axis Z.

The first corrugations 72 are spaced one from the next by a regular corrugation pitch 26. Furthermore, the primary sealing membrane 70 typically has second corrugations 73 which are perpendicular to the first corrugations 72. As depicted in the figures and particularly in FIG. 3, the plates 71, 71A each have corrugation portions which, when the plates 71 and 71A are juxtaposed, together constitute the corrugations 72, 73.

As depicted more particularly in FIG. 6, the rectangular metal plates 71 are arranged in such a way as to form ring portions 75 juxtaposed successively along the sector axis X. The metal connecting plates 71A extend each of the ring portions 75 so that they, together with all the angular sectors, form rings extending right around the centre of the bottom wall 21.

The corrugated metal connecting plates 71A of the ring portions 75 are aligned with one another in a radial direction. The radial direction is inclined with respect to the sector axis X by an angle equal to half the angular-sector angle 25. The sealing membrane 70 of each angular sector 25 of the bottom wall 21 comprises a radial corrugation 77 situated near one edge of the angular sector 25. The radial corrugation 77 extends in the radial direction and is produced on the corrugated metal connecting plates 71A.

FIG. 3, which depicts the prior art, shows, in perspective from the inside of the facility 1, the radially outer end of an angular sector 25 and portions of the vertical wall 22 of the tank 20. FIG. 3 does not show the vertical load-bearing panels 14 of the vertical load-bearing wall 12.

At the vertical wall 22, the metal sealing membrane 170 is chiefly made up of juxtaposed rectangular metal plates 171 and has corrugations 172 which are vertical, namely which extend parallel to the vertical axis Z, parallel to the vertical load-bearing panels 14. The vertical corrugations 172 are spaced one from the next by the regular corrugation pitch 26.

Likewise, the metal sealing membrane 170 typically has horizontal corrugations 173 which are perpendicular to the vertical corrugations 172 and make a complete circuit of the tank 20. These metal plates 171 each have corrugation portions which, when the metal plates 171 are juxtaposed, together constitute the corrugations 172, 173, as visible in FIG. 3.

As illustrated in FIGS. 3 to 5, each angular sector 25 is connected, on the one hand, to a complete vertical panel 241 from among the N vertical panels 24 and, on the other hand, to two vertical half-panels 242 each corresponding to half of a vertical panel 24 from among the N vertical panels 24 of the vertical wall 22. The complete vertical panel 241 is centred on the angular sector 25 and the vertical half-panels 242 are situated one on each side of the complete vertical panel 241. The angular sectors 25 are depicted schematically in dotted line in FIG. 2. The sector axis X is defined here for each angular sector 25 as passing through the centre of the tank 20 and perpendicular to the corresponding complete vertical panel 241.

In FIG. 3 of the prior art, in line with the complete vertical panel 241 and the vertical half-panels 242, the metal plates 71 and the metal connecting plates 71A are extended by metal connecting plates 74 which bear corrugation portions situated in the continuation of the corrugation portions of the metal plates 71, 71A so as to continue the first corrugations 72 as far as corner connecting pieces 69. These corner connecting pieces 69 are more particularly described in document WO2022/200536. Thus, in the prior art, the first corrugations 72 are continued as far as the complete vertical panel 241 and as the vertical half-panels 242 so as to be continuously connected to the vertical corrugations 172 using the corner connecting pieces 69.

As explained in the introduction, with this type of layout of the prior art which dictates continuity between the first corrugations 72 of the bottom wall 21 and the vertical corrugations 172 of the vertical wall 22 with a regular corrugation pitch 26, the incremental difference in diameter between two storage facilities using this layout is dictated by the addition or subtraction of one vertical corrugation 172 per vertical panel 24 (and therefore of the associated first corrugation). The incremental difference in diameter is thus proportional to the regular corrugation pitch 26. The number of dimensional options for such a facility is therefore limited, and this becomes all the more problematical when the regular corrugation pitch 26 is of great length.

FIGS. 4 and 5 depict two embodiments of the storage facility 1 in which, unlike in the prior art illustrated in FIG. 3, the correlation between the vertical corrugations 172 and their associated first corrugations 72 is locally broken. In these diagrams, solid line indicates the edges of the plates 71, 71A, 171 and the junction 28 between the bottom wall 21 and the vertical wall 22, while broken line indicates the corrugations 72, 73, 77, 172, 173. Similarly, in FIG. 6, solid line indicates the edges of the plates 71, 71A whereas broken line indicates the corrugations 72, 73, 77.

As can be seen in FIGS. 4 and 5, the continuity of the first corrugations 72 with the vertical corrugations 172 at the complete vertical panel 241 for each angular sector 25 is conserved, in the same way as in the prior art. However, at each vertical half-panel 242, the vertical corrugations 172 are not continuous with the first corrugations 72.

Specifically, for each angular sector 25, a singular corrugation pitch 27 shorter than the regular corrugation pitch 26 has been introduced between each vertical half-panel 242 and the complete vertical panel 241. The two vertical corrugations 172 delimiting the singular corrugation pitch 27 thus comprise a singular corrugation 174 situated on the vertical half-panel 242, as visible in FIGS. 4 and 5. Thus, the singular corrugation 174 and the other vertical corrugations 172 situated between the singular corrugation 174 and an outer edge of the half-panel are misaligned and therefore not continuous with the first corrugations 72 of the bottom wall 21.

The presence of the singular corrugation pitch 27 thus makes it possible to add intermediate dimensional solutions that can be modulated by means of the value of the singular corrugation pitch 27, between two layouts comprising only regular corrugation pitches 26.

Having the first corrugations 72 and the vertical corrugations 172 ending abruptly at the junction between a vertical half-panel 242 and the bottom wall 21 may affect the flexibility of the sealing membrane at this junction.

This is why it is advantageous to extend some of these first corrugations 72 or vertical corrugations 172 beyond this junction so that it carries over onto the vertical wall 22 or onto the bottom wall 21 respectively. This extension thus locally improves the flexibility of the sealing membrane.

Thus, in the first embodiment illustrated in FIG. 4, the vertical corrugations 172 of each vertical half-panel 242 are extended onto the bottom wall 21 by a vertical corrugation continuation 175 so that the vertical corrugations 172 carry over onto the bottom wall 21. This extension onto the bottom wall 21 remains, however, localized. Specifically, the vertical-corrugation extensions 175 are interrupted on the bottom wall 21 some distance from the second corrugation 73 situated near the junction between the bottom wall 21 and the vertical wall 22.

Similarly, in the second embodiment illustrated in FIG. 5, it is the first corrugations 72 that are extended onto the vertical half-panel 242 by a first-corrugation extension 76 so that the first corrugations 72 carry over onto the vertical wall 22. This extension onto the vertical wall 22 remains, however, localized. Specifically, the first-corrugation extensions 76 are interrupted on the vertical wall 22 some distance from the horizontal corrugation 173 situated near the junction between the bottom wall 21 and the vertical wall 22.

In an embodiment that has not been illustrated, it is also conceivable for the first corrugations 72 and the vertical corrugations 172 to be extended respectively onto the vertical wall 22 and onto the bottom wall 21.

FIG. 6 depicts the primary sealing membrane 70 of an angular sector 25 of the bottom wall 21, viewed from above according to one embodiment. As mentioned previously, the metal plates 71 of each angular sector 25 are arranged in such a way as to form ring portions 75 juxtaposed successively along the sector axis X. The width of a ring portion 75 along the axis X corresponds, for the vast majority of the metal plates 71, to the length of these plates 71.

However, the metal plates 71 do not all have the same dimensions. Thus, in the example of FIG. 6, the metal plates 71 come in four different sizes, namely:

- metal plates 71 of dimension "X1" comprising one first corrugation 72 and three second corrugations 73 one of which passes through the middle of the metal plate 71,
- metal plates 71 of dimension "X2" having, in the example, a length along the axis X that is equal to the length of the plates "X1" and a width in a direction orthogonal to the axis X that is less than the width of the plates "X1",
- metal plates 71 of dimension "X3" having a width equal to the width of the plates "X2", the length being less than half the length of the plates "X2" so that the plates "X3" comprise one single second corrugation 73,
- metal plates 71 of dimension "X4", having a width less than the width of the plates "X3" such that they have no first corrugation 72 and a length such that the sum of the length of a plate "X3" and the length of a plate "X4" is equal to the length of a plate "X2" (or "X1").

In the example depicted in FIG. 6, the angular sector 25 comprises, from the centre of the bottom wall 21 towards the vertical wall 22:

- a first ring portion 75 comprising two dimension "X3" metal plates side-by-side among the metal plates 71;
- a second ring portion 75 comprising two "X2" metal plates side-by-side;
- a third ring portion 75 comprising two "X1" metal plates side-by-side;
- a fourth ring portion 75 comprising two "X1" metal plates flanked on each side by an "X4" metal plate followed by an "X3" plate along the axis X;
- a fifth ring portion 75 comprising two "X1" plates flanked on each side by an "X2" plate;
- a sixth ring portion 75 with a similar pattern to the third ring portion and two additional "X1" plates;
- a seventh ring portion 75 with a similar pattern to the fourth ring portion 75 and two additional "X1" plates.

Similarly, the metal connecting plates 71A do not all have the same dimensions. These metal connecting plates 71A also, in the example of FIG. 6, exhibit a pattern that repeats every three ring portions 75.

As set out previously, the prior art applies a layout strategy arranged by angular sector 25 which seeks to establish a link between the corrugation pitch 26 of the first corrugations 72 and the length of the metal plates 71, or a width of the ring portion 75, and the angle of the angular sector 25 so as notably to reduce the number of different parts in an angular sector 25. Thus, the total number of first corrugations 72 present on the ring portions 75, which increases in the direction of the vertical wall 22, is increased for each successive ring portion 75 by two further first corrugations 72 on each side of the angular sector 25. Specifically, in the prior art, the width of a ring portion, L, the regular corrugation pitch P and the angular-sector angle A are linked by the following equation:

$$\tan(A/2) = P/L$$

Nevertheless, in the case of a long corrugation pitch like that depicted in the example illustrated in FIG. 6, namely a corrugation pitch of 1020 mm for plates measuring 3000×1000 mm, this layout strategy does not allow a consistent angular-sector angle to be conserved without significantly increasing the size of the plates 71.

Thus, in the embodiment depicted in FIG. 6, with a corrugation pitch of 1020 mm, the total number of first corrugations 72 present on the ring portions 75 is increased only every three successive ring portions 75. In this example, the factor three thus makes it possible to keep the angle values for the angular sectors 25 and size of the metal sheets 71 within an acceptable range.

The first corrugations 72 of each angular sector 25 thus comprise, as visible in FIG. 6, first complete corrugations 721 extending from a junction between the bottom wall 21 and the vertical wall 22 as far as a central ring portion 75 near a centre of the bottom wall 21, and first partial corrugations 722 which are interrupted by a corrugation interruption 723. Specifically, the first partial corrugations 722 are interrupted when said first partial corrugation 722 crosses a corrugated metal connecting plate 71A. Thus, the corrugation interruption 723 is situated some distance from the radial corrugation 77 of said angular sector 25 or of an adjacent angular sector. In addition, the corrugation interruption 723 is situated between two adjacent second corrugations 73.

By stopping the first partial corrugations 722 at a corrugated metal connecting plate 71A, it is thus possible to maintain a minimum distance between the radial corrugation 75 and said first partial corrugation 722 while at the same time limiting the maximum corrugation pitch between the radial corrugation 77 and the first corrugation 72 situated closest to the radial corrugation 77.

FIG. 7 more particularly depicts one of the ring portions 75 of the angular sector 25 illustrated in FIG. 6. This figure notably illustrates the particular assembly of the metal plates 71 with the metal connecting plates 71A. In addition, in this ring portion 75, one of the first partial corrugations 722 crosses one of the metal connecting plates 71A and thus exhibits a corrugation interruption 723.

With reference to FIG. 8, a cutaway view of a methane carrier ship 100 shows a sealed and thermally insulating tank 112 of prismatic overall shape mounted in the double hull 102 of the ship 100. The wall of the tank comprises a primary sealing membrane intended to be in contact with the LNG contained in the tank, a secondary sealing membrane arranged between the primary sealing membrane and the double hull 102 of the ship 100, and two thermally insulating barriers arranged respectively between the primary sealing membrane and the secondary sealing membrane and between the secondary sealing membrane and the double hull 102.

As is known per se, loading/offloading pipes 103 arranged on the upper deck of the ship can be connected, by means of appropriate connectors, to a maritime or harbour terminal in order to transfer a cargo of LNG from or to the tank 112.

FIG. 8 depicts one example of a marine terminal including a loading and offloading station 105, an underwater pipe 106 and an onshore storage facility 1. The loading and offloading station 105 is a fixed offshore facility comprising a mobile arm 104 and a column 108 which supports the mobile arm 104. The mobile arm 104 carries a bundle of insulated hoses 109 that can connect to the loading/offloading pipes 103. The orientable mobile arm 104 can be adapted to suit all sizes of methane carrier. A connecting pipe, not shown, extends inside the column 108. The loading and offloading station 105 makes it possible to load and offload from the methane carrier 100 from or to the onshore storage facility 1. This facility has liquefied-gas storage tanks 20 and connecting pipes 111 connected via the underwater pipe 106 to the loading/offloading station 105. The underwater pipe 106 allows the transfer of the liquefied gas between the loading/offloading station 105 and the onshore storage facility 1 over a long distance, for example 5 km, and this makes it possible to keep the methane carrier ship 100 standing off a long distance from the coast during the loading and offloading operations.

In order to generate the pressure needed for transferring the liquefied gas, use is made of pumps carried on board the ship 100 and/or pumps with which the onshore storage facility 1 is equipped and/or pumps with which the loading and offloading station 105 is equipped.

Although the invention has been described in connection with a number of particular embodiments, it is quite obvious that it is in no way limited thereto and that it comprises all the technical equivalents of the means described and also their combinations, if these come within the scope of the invention.

The use of the verb "have", "comprise" or "include" and their conjugated forms does not exclude the presence of elements or steps other than those set out in a claim.

In the claims, any reference sign between parentheses should not be interpreted as imposing a limitation on the claim.

What is claimed is:

1. A liquefied gas storage facility (1) comprising:

a load-bearing structure (10) having an internal space delimited by a bottom load-bearing wall (11) and a vertical load-bearing wall (12), a contour of said bottom load-bearing wall (11) having the shape of an N-sided regular polygon, N being an integer greater than or equal to 4, said vertical load-bearing wall (12) being made up of N vertical load-bearing panels (14) and forming a polygonal cylindrical surface having said regular polygon as its directrix, where each of the N sides of the polygon corresponds to an intersection between the bottom load-bearing wall (11) and one of said vertical load-bearing panels (14); and a sealed tank (20) installed in the internal space of the load-bearing structure (10), the sealed tank (20) comprising a bottom wall (21) placed on the bottom load-bearing wall (11) and a vertical wall (22) placed on the vertical load-bearing wall (12), said vertical wall (22) being made up of N vertical panels (24), each vertical panel of the vertical wall (22) being fixed to one of the N vertical load-bearing panels (14), said bottom wall (21) comprising a plurality of angular sectors that are the image of one another through rotation by a predetermined angle about a vertical axis (Z), the predetermined angle being equal to k.360°/N, where k is a positive integer less than or equal to half of N, each angular sector (25) of the bottom wall (21) being connected to at least k of the N vertical panels (24) of the vertical wall (22), the sealed tank (20) comprising a corrugated sealing membrane (70, 170) intended to be in contact with a liquefied gas, wherein the corrugated sealing membrane (70, 170) of each angular sector (25) of the bottom wall (21) has first corrugations (72) oriented along a sector axis (X), the sector axis (X) being perpendicular to a first vertical panel connected to said angular sector (25), the first corrugations (72) being spaced one from the next by a regular corrugation pitch, wherein the corrugated sealing membrane (70, 170) of each angular sector (25) of the bottom wall (21) comprises a plurality of metal plates (71) welded together in a fluid-tight manner, the metal plates (71) being arranged to form ring portions (75) juxtaposed successively along the sector axis (X), each ring portion (75) consisting of a set of complete metal plates, and wherein the total number of first corrugations (72) per ring portion (75) that are present on the ring portions (75) increases in the direction of the first vertical panel, said total number per ring portion (75) being increased only every M successive ring portion (75) where M is a natural integer greater than or equal to 2.

2. The liquefied gas storage facility (1) according to claim 1, wherein the ring portions (75) have an inner edge and an outer edge which are perpendicular to the sector axis (X) and each have a width extending along the sector axis (X)

between the inner edge and the outer edge of the ring portion (75), said width being equal in several of said ring portions (75).

3. The liquefied gas storage facility (1) according to claim 2, wherein the width of the ring portion (75) situated close to a centre of the bottom wall (21) and/or the width of the ring portion (75) situated close to the vertical wall (22) is different from the width of the other ring portions (75).

4. The liquefied gas storage facility (1) according to claim 1, wherein the regular corrugation pitch is greater than or equal to 400 mm, preferably greater than or equal to 800 mm.

5. The liquefied gas storage facility (1) according to claim 1, wherein each ring portion (75) of an angular sector (25) comprises at least one corrugated metal connecting plate (71A) situated on one lateral edge of the ring portion (75), the corrugated metal connecting plates (71A) being configured to connect said ring portion (75) to a ring portion (75) of an adjacent angular sector (25), the corrugated metal connecting plates (71A) that connect the ring portions (75) being aligned with one another in a radial direction, the radial direction being inclined with respect to the sector axis (X).

6. The liquefied gas storage facility (1) according to claim 5, wherein the sealing membrane of the angular sector (25) of the bottom wall (21) comprises a radial corrugation (77) situated near one edge of the angular sector (25), the radial corrugation (77) extending in the radial direction.

7. The liquefied gas storage facility (1) according to claim 6, wherein the first corrugations (72) of the angular sector (25) comprise first complete corrugations (721) extending from a junction (28) between the bottom wall (21) and the vertical wall (22) as far as a central ring portion near a centre of the bottom wall (21), and first partial corrugations (722) which are interrupted by a corrugation interruption (723) where said first partial corrugation crosses one of the corrugated metal connecting plates (71A), the corrugation interruption (723) being situated some distance from the radial corrugation (77).

8. The liquefied gas storage facility (1) according to claim 6, wherein the radial corrugation (77) of the angular sector (25) is produced on the corrugated metal connecting plates (71A).

9. The liquefied gas storage facility (1) according to claim 5, wherein the corrugated metal connecting plate (71A) for a ring portion (75) of row A is identical to the corrugated metal connecting plate (71A) of a ring portion (75) of row A+B, where the row is defined as being a natural integer incremented by progressing along the sector axis (X) towards the vertical wall (22), A being a natural integer greater than or equal to 1 and B being a natural integer greater than or equal to 2.

10. The liquefied gas storage facility (1) according to claim 1, wherein the sealing membrane of an angular sector (25) of the bottom wall (21) comprises second corrugations (73) spaced apart from one another and extending at least partially perpendicular to the first corrugations (72).

11. The liquefied gas storage facility (1) according to claim 7, wherein the sealing membrane of an angular sector (25) of the bottom wall (21) comprises second corrugations (73) spaced apart from one another and extending at least partially perpendicular to the first corrugations (72), and wherein the corrugation interruption (723) of the first partial corrugations (722) is situated between two adjacent second corrugations (73).

12. The liquefied gas storage facility (1) according to claim 1, wherein the storage facility (1) is an onshore storage facility.

13. The liquefied gas storage facility (1) according to claim 3, wherein the other ring portions (75) have identical widths to one another.

14. The liquefied gas storage facility (1) according to claim 4, wherein the regular corrugation pitch is between 800 and 1200 mm.

15. The liquefied gas storage facility (1) according to claim 5, wherein the radial direction is inclined with respect to the sector axis (X) by an angle equal to half the predetermined angle.

* * * * *